United States Patent
Mall et al.

(10) Patent No.: US 7,793,149 B2
(45) Date of Patent: Sep. 7, 2010

(54) KERNEL ERROR RECOVERY DISABLEMENT AND SHARED RECOVERY ROUTINE FOOTPRINT AREAS

(75) Inventors: Michael G. Mall, Round Rock, TX (US); Bruce Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 11/676,536

(22) Filed: Feb. 20, 2007

(65) Prior Publication Data
US 2008/0201604 A1     Aug. 21, 2008

(51) Int. Cl.
*G06F 11/00*  (2006.01)
(52) U.S. Cl. .................. 714/15; 714/37; 718/104; 713/1; 713/2
(58) Field of Classification Search .............. 714/15, 714/37; 718/104; 713/1, 2
See application file for complete search history.

(56) References Cited

U.S. PATENT DOCUMENTS

| | | | | |
|---|---|---|---|---|
| 5,528,750 A | * | 6/1996 | Lubart et al. ........... | 714/15 |
| 5,905,857 A | * | 5/1999 | Buzby et al. ........... | 714/38 |
| 6,035,419 A | * | 3/2000 | Breslau et al. .......... | 714/20 |
| 6,173,421 B1 | * | 1/2001 | Weaver Johnson et al. | 714/38 |
| 2003/0018681 A1 | * | 1/2003 | Subramanian et al. .... | 709/102 |
| 2007/0239942 A1 | * | 10/2007 | Rajwar et al. ........... | 711/147 |

* cited by examiner

*Primary Examiner*—Robert Beausoliel
*Assistant Examiner*—Charles Ehne
(74) *Attorney, Agent, or Firm*—Dillon & Yudell LLP

(57) ABSTRACT

A method, computer program product, and data processing system for providing optional failure recovery features in operating system kernel code are disclosed. In accordance with a preferred embodiment, a segment of mainline code may designate a recovery routine for that segment by calling a kernel service provided for that purpose. The kernel service allocates a "footprint" region on the recovery stack for storing state information arising from the execution of the recovery-enabled code. In the event of an exception, a recovery manager routine uses information from the recovery stack to recover from the exception. Recovery may be disabled altogether for performance purposes by way of boot-time patching to disable the use of the recovery stack and to allow state information to be written to a static "scratchpad" area, which unlike the recovery stack, is allowed to be overwritten, its contents being ignored.

20 Claims, 8 Drawing Sheets

KERNEL ERROR RECOVERY DISABLEMENT AND SHARED RECOVERY ROUTINE FOOTPRINT AREAS

STATEMENT OF GOVERNMENT FUNDING

This invention was made with Government support under DARPA, NBCH3039004. THE GOVERNMENT HAS CERTAIN RIGHTS IN THIS INVENTION.

CROSS-REFERENCE TO RELATED APPLICATION

The present application is related to U.S. Non-Provisional patent application Ser. No. 11/676,546, entitled "Recovery Routine Masking and Barriers to Support Phased Recovery Development," which is filed even date hereof, assigned to the same assignee, and incorporated herein by reference in its entirety.

BACKGROUND OF THE INVENTION

1. Technical Field

The present invention relates generally to error/exception recovery. Specifically, the present invention is directed to a method, computer program product, and data processing system for providing optional failure recovery for desired routines in an operating system kernel.

2. Description of the Related Art

Computers are generally, by nature, deterministic machines, but they must operate in a non-deterministic world. Hardware malfunctions, invalid data or instructions, unpredictable user input, and even cosmic radiation from the farthest reaches of outer space can influence the behavior of a computer system in undesirable ways. Ultimately, any truly useful computer system is capable, whether by programming, user input, or hardware malfunction, of producing an undesired result (or, as is often the case, no result). For example, one of the fundamental results of computability theory (the undecidability of the halting problem) is that it is, in the general case, impossible to determine with certainty whether a given program of instructions will terminate ("halt") or enter into an infinite loop ("hang" or "diverge") on a given input.

Thus, all useful computers must react at some level to asynchronous, non-deterministic, or otherwise unpredictable events, even if such reaction takes the form of a system crash or hang condition. One of the aims of most operating systems and other runtime environments is to avoid the occurrence of crashes and hangs. For example, most modern operating systems can terminate an application process in the event that the application performs an invalid or illegal instruction or memory access. In these instances, the computer hardware will generally detect the offending instruction or memory operation and raise an exception, causing an interrupt handling routine in the operating system to take notice of the exception and deal with it accordingly, often by terminating the application.

Of course, an operating system kernel is itself a computer program and is capable of experiencing the same malfunctions and other problems as any other computer program. The main distinguishing trait of an operating system kernel is that once the kernel crashes or hangs, usually the entire computer system will crash or hang. Thus, it is imperative for the stability of a computer system that kernel crashes and hangs are avoided at all costs.

Some operating systems, such as the AIX operating system (a product of International Business Machines Corporation), allow certain locations in kernel code to be designated as re-entry points in the event of certain types of failure. In AIX, for example, a call to the function "setjmpx( )" allows the current location in the kernel code to be designated as the re-entry point on failure. Such facilities allow some errors to be addressed within the kernel code by re-entering the kernel code at the designated point with a failure code, but they are limited in the types of failure from which recovery can be performed. In particular, failures that require significant state information to recover from (such as those in which system resources have been obtained subsequent to setting the re-entry point, which should be released during the recovery process) are not appropriate for the "setjmpx( )" approach.

Moreover, it would be desirable to allow kernel recovery features to be implemented gradually across an operating system kernel, so that, in early and intermediate versions of the operating system, some operating system routines may support kernel recovery, while others do not. This would allow operating system updates to be made more easily, so that kernel recovery features may be integrated into an operating system without the necessity of a major rewrite or re-release of the software. Since operating system updates are easily distributed electronically through the Internet (and often automatically installed by the operating system itself), this ability would be immediately advantageous. It would also be advantageous, from a performance standpoint to provide an ability to disable recovery (and the computing overhead associated therewith) when not needed or desired, for performance purposes.

What is needed, therefore, is a method for providing more comprehensive recovery from kernel failures, in which optional recovery features may be gradually added to an operating system kernel. The present invention provides a solution to this and other problems, and offers other advantages over previous solutions.

SUMMARY OF THE INVENTION

Accordingly, the present invention provides a method, computer program product, and data processing system for providing optional failure recovery features in operating system kernel code. In accordance with a preferred embodiment, a segment of mainline code may designate a recovery routine for that segment by calling a kernel service provided for that purpose. The kernel service pushes the address of the designated recovery routine, context, and re-entry point information corresponding to the segment to a recovery stack. An additional "footprint" region is also allocated on the recovery stack. The recovery-enabled code uses the "footprint" region to store state information arising from the execution of the recovery-enabled code. In the event of an exception, a recovery manager routine reads the address of the designated recovery routine from the stack and causes the routine to be executed, then returns to the recovery-enabled routine at the re-entry point indicated on the recovery stack. A mask value or barrier count value is also stored on the recovery stack to allow recovery to be disabled for non-recoverable routines. Recovery may be disabled altogether for performance purposes by way of boot-time patching to disable the use of the recovery stack and to allow state information to be written to a static "scratchpad" area, which unlike the recovery stack, is allowed to be overwritten, its contents being ignored.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
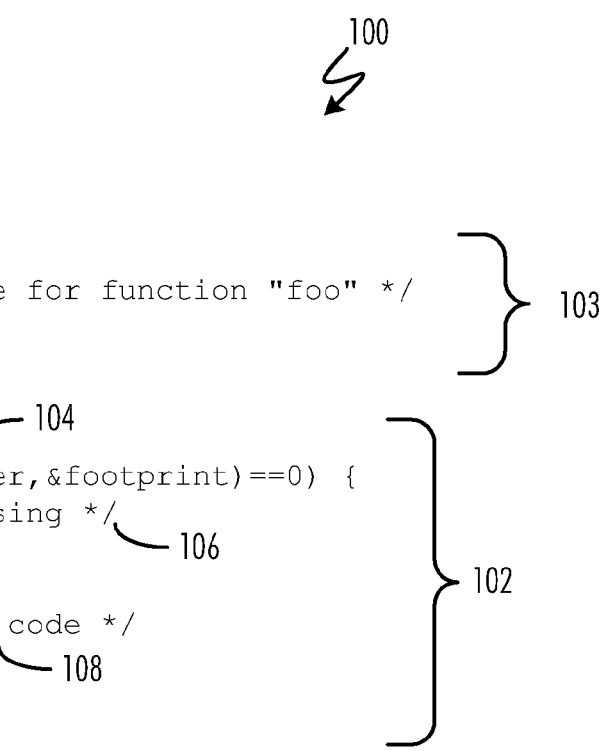
FIG. 1 is a diagram of an example listing of operating system kernel code in the C programming language employing the failure recovery technology of a preferred embodiment of the present invention.

FIG. 1 is a diagram of an example listing 100 of operating system kernel code in the C programming language employing the failure recovery technology of a preferred embodiment of the present invention. Function foo( ) 102 is a routine for which recovery is enabled. "If" statement 104 calls function "frr_add( )," which designates a failure recovery routine (FRR) for function foo( ) 102, namely function error_handler( ) 103. Function frr_add( ) normally stores context information on the recovery stack (recovery stack 200 in FIG. 2), returns the address of a footprint area on the recovery stack, and returns the value 0 (zero) as the result (return value) of the function (a return value of zero being the C-language convention for successful function completion), thus causing "then" compound statement 106 (inside curly braces) to be executed (since the comparison in "if" statement 104 evaluates to "true"). Compound statement 106 represents the mainline code of the function foo( ) 102 (i.e., the code performing the normal operations of function foo( ) 102).

In the event of a failure exception being raised during execution of compound statement 106, the designated recovery routine (in this case function error_handler( ) 103) will be executed to perform whatever actions are needed to recover from the failure, and function foo( ) 102's execution will resume from "if" statement 104, as if returning from function "frr_add( )," except that now a non-zero value is returned, thus causing the comparison in "if" statement 104 to evaluate to "false" and cause "else" compound statement 108 to be executed. Compound statement 108 contains post-recovery code to be executed only in the event of a failure exception and successful recovery re-entry to mainline code. Finally (regardless of the evaluation of "if" statement 104), a call is made to function "frr_delete( )" at line 110 to disable the recovery routine and reclaim the recovery stack space (as in FIG. 2) used to store the context and footprint information used to enable failure recovery for function foo( ) 102.

Figure 2:
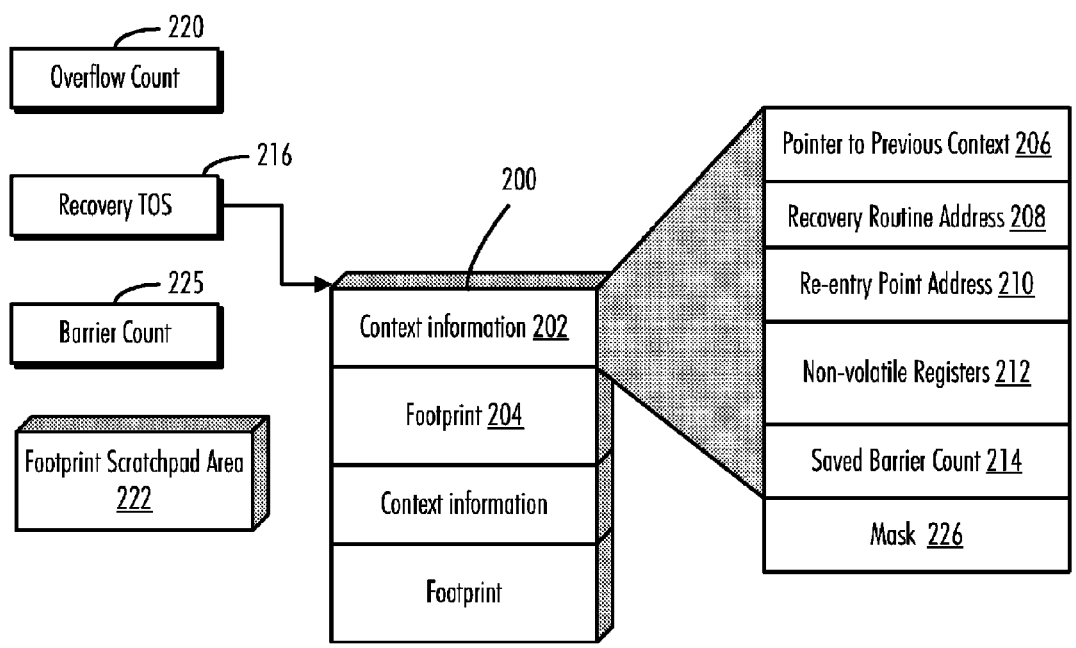
FIG. 2 is a diagram of a recovery stack and ancillary memory regions utilized in a preferred embodiment of the present invention.

FIG. 2 is a diagram of a recovery stack 200 and ancillary memory regions utilized in a preferred embodiment of the present invention. Recovery stack 200 and the other memory regions in FIG. 2 exist on a per-thread basis. That is, each thread in the system has a recovery stack, overflow count, etc., as depicted in FIG. 2. This allows every thread to have its own recovery environment.

Figure 6:
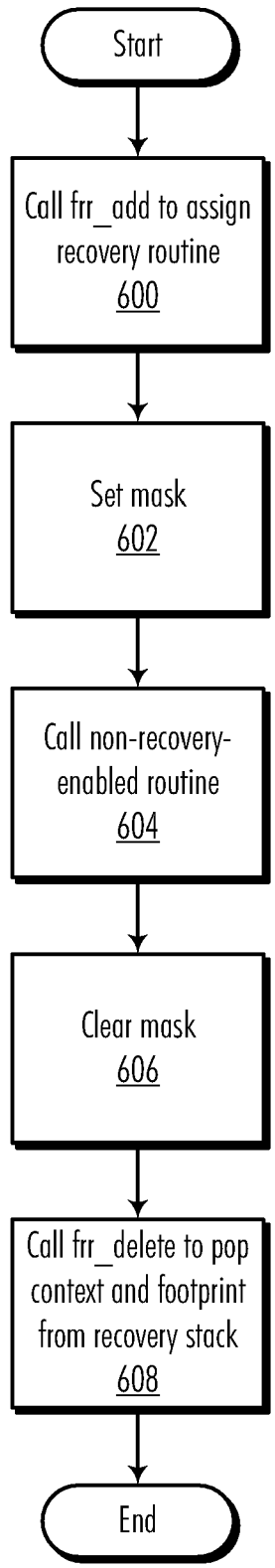
FIG. 6 is a flowchart representation of a process of calling a routine of non-recovery-enabled kernel code from a routine of recovery-enabled kernel code in accordance with a preferred embodiment of the present invention.
Figure 7:
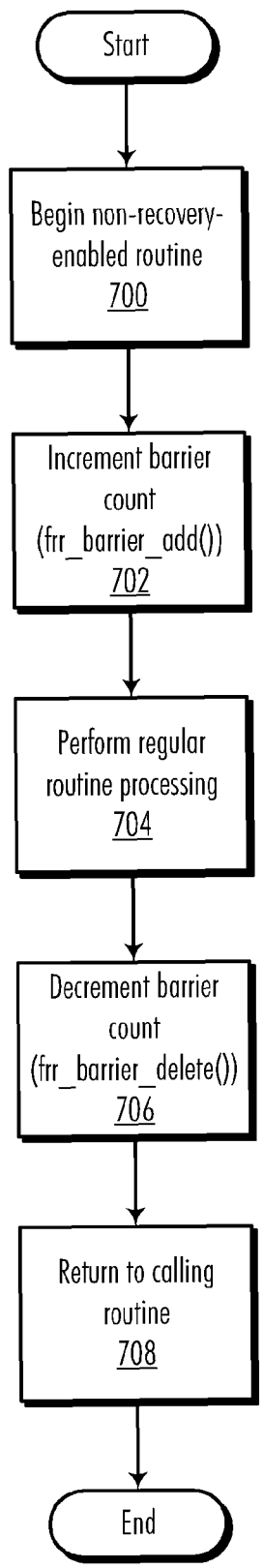
FIG. 7 is a flowchart representation of an alternative process of calling a routine of non-recovery-enabled kernel code from a routine of recovery-enabled kernel code in accordance with a preferred embodiment of the present invention.

Turning now to the specifics of a single recovery environment as represented in FIG. 2, when a recovery routine is designated as in the example provided in FIG. 1, context information needed to perform failure recovery (context information 202) is pushed onto the top of recovery stack 200 (with recovery top-of-stack [TOS] pointer 216 pointing to the current top of recovery stack 202 for this purpose). In this preferred embodiment, context information 202 includes a pointer to the designated recovery routine 208, the address of the re-entry point to the recovery-enabled mainline code 210, copies of non-volatile registers (i.e., registers that must be preserved in order to re-enter the recovery-enabled mainline code) 212, a saved copy of "barrier count" 225 (saved barrier count 214) and a "mask" value 226, which are used to disable failure recovery when calling a routine that does not support failure recovery, as illustrated in FIGS. 6 and 7. In a preferred embodiment of the present invention, when a recovery-enabled routine calls a routine that does not support failure recovery, the barrier count or mask value (depending on the particular routine—see FIGS. 6 and 7 and the accompanying text) is made to contain a non-zero value, which alerts the recovery manager routine that failure recovery is disabled (see FIG. 5 and accompanying text). Context information 202 also includes a pointer 206 to the previous context entry on the stack. Alternatively, a "type" indicator could be used in place of pointer 206 to indicate the location of the next context entry on the stack, assuming that each context entry of a given "type" has a particular, pre-defined size.

Along with context information 202, a footprint area 204 is allocated on recovery stack 200 when frr_add( ) is called. Footprint area 204 is a storage area used by mainline code to store state information to be used during failure recovery. Examples of such state information would include (but are by no means limited to) records of resource allocations, such as a handle to a dynamically-allocated block of memory or a file descriptor, or concurrency control data, such as a pointer to a mutex or lock structure. During failure recovery, the designated recovery routine (pointed to by recovery routine pointer 208) uses the information stored in footprint area 204 to determine the current execution state of the mainline code involved in the failure and release resources and concurrency control constructs appropriately so as to permit failure recovery and resumption of execution at the re-entry point pointed to by re-entry pointer 210.

In a preferred embodiment, a limited amount of memory is allocated for recovery stack 202. Once recovery stack 202 has grown to a maximum-permitted size (via nested calls to recovery-enabled routines), additional recovery-enabling information cannot be stored on recovery stack 202 until a sufficient number of the called routines has completed so as to free space on recovery stack 202. To allow additional nested calls once recovery stack 202 has reached maximum size, an "overflow counter" 220 is provided to count the number of as-yet-incomplete nested calls to made since recovery stack 202 reached maximum size. Overflow counter 220 thus allows recovery stack 202 to grow in size conceptually without actually having to increase the actual physical size of recovery stack 202. Overflow counter 220 also doubles as a Boolean flag in that failure recovery is disabled as long as overflow counter 220 holds a non-zero value.

To allow this "virtual lengthening" of recovery stack 202 in a manner transparent to mainline code, a footprint scratchpad area 222 is provided. Scratchpad 222 is a separate region of memory from recovery stack 202, but is the same size as a footprint region would be on recovery stack 202. When recovery stack 202 has reached maximum physical size, the frr_add( ) routine returns the address of scratchpad 222 to allow mainline code to use scratchpad 222 to write the state information it would normally place in a footprint area on recovery stack 202. Scratchpad 222 may be written and overwritten numerous times by mainline code, since its contents will be ignored. Providing scratchpad 222 in this manner avoids the additional overhead of including instructions in every recovery-enabled routine to determine whether or not state information can be stored in a footprint area.

Figure 3:
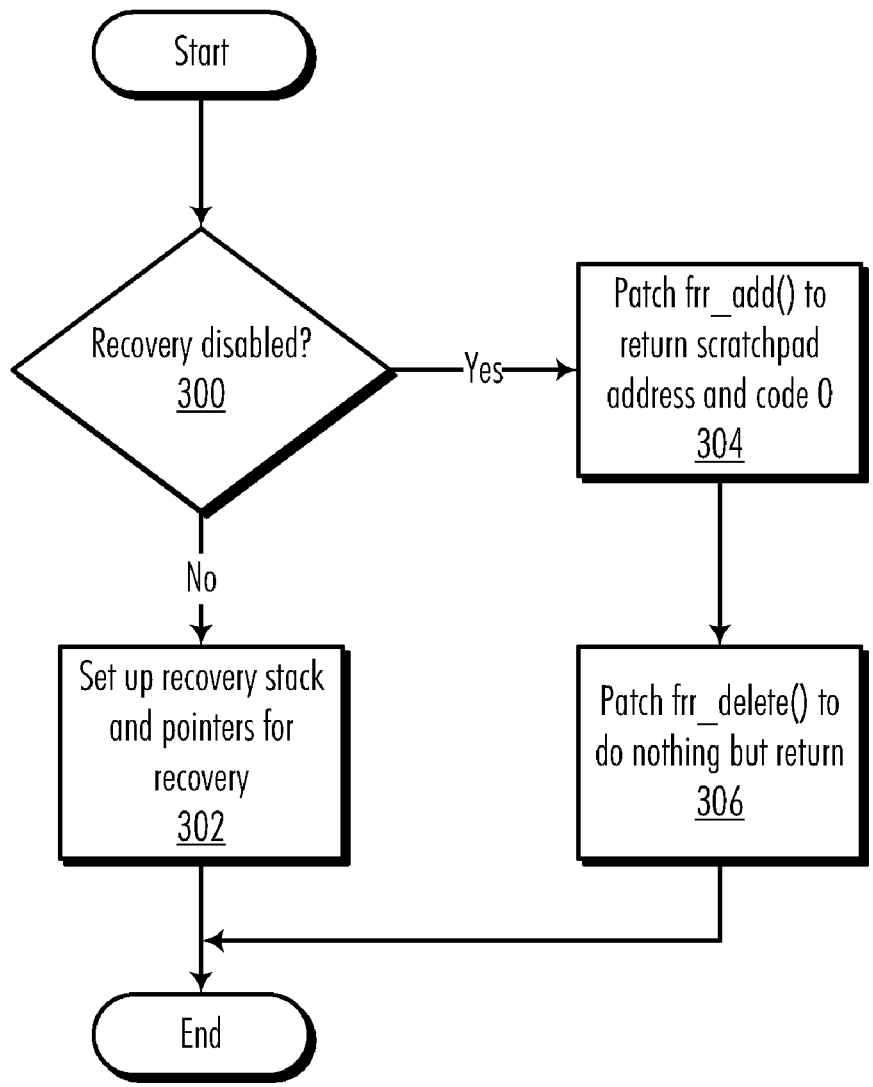
FIG. 3 is a flowchart representation of a process of optionally disabling failure recovery in a preferred embodiment of the present invention.

An additional use for scratchpad 222 is illustrated in flowchart form in FIG. 3. For performance reasons, it may be desirable to disable failure recovery altogether by way of a configuration parameter read at boot-time. FIG. 3 illustrates a process for carrying out this disablement at boot-time. If recovery is not to be disabled (block 300:No), the recovery stack and associated pointers are set up as normal (block 302). However, if recovery is to be disabled (block 300:Yes), the functions frr_add( ) and frr_delete( ) (for pushing recovery-related information to the recovery stack and popping the information when no longer needed, respectively) are patched (i.e., overwritten) with simple functions that do nothing but return an integer-zero completion code, denoting successful completion (and, in the case of the patched frr_add( ), the address of footprint scratchpad area 222) (block 304). This has the effect of completely bypassing normal failure recovery. In addition, frr_add( )'s returning the address of footprint scratchpad area 222 causes any state information that would normally be placed on recovery stack 202 by mainline code to be instead harmlessly written to scratchpad 222 and ignored (thereby avoiding the overhead associated with repeatedly determining whether failure recovery has been disabled or not).

Figure 4:
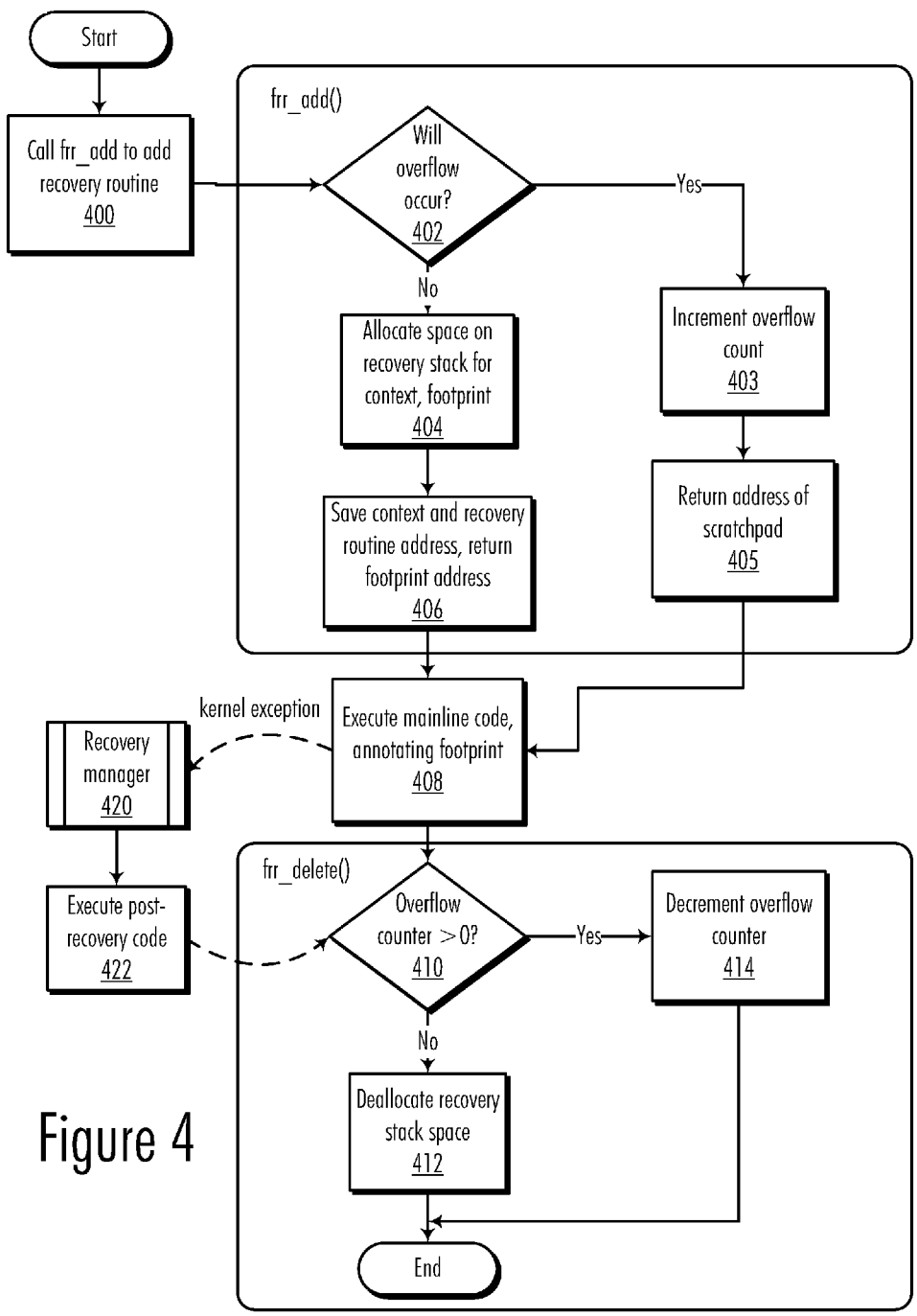
FIG. 4 is a flowchart representation of a process of executing a routine of recovery-enabled kernel code in accordance with a preferred embodiment of the present invention.

FIGS. 4-7 summarize, in flowchart form, the processes employed by a preferred embodiment of the present invention. FIG. 4 is a flowchart representation of a process of executing a routine of recovery-enabled kernel code in accordance with a preferred embodiment of the present invention. The recovery-enabled code first calls function frr_add( ) to designate a recovery routine to be used for the recovery-enabled code (block 400).

Function frr_add( ) proceeds as follows: If pushing/allocating the additional context information and footprint space needed to designate a recovery routine would cause the recovery stack to exceed the space allocated for it—i.e., make it overflow (block 402:Yes), then the frr_add( ) routine increments overflow counter 220 (block 403) and returns the address of the footprint scratchpad 222 instead of a stack-allocated footprint area (block 405), thereby "virtually lengthening" recovery stack 202, as described above. If sufficient space exists for the information to be physically pushed onto recovery stack 202, however (block 402:No), then recovery stack TOS pointer 216 is adjusted to allocate the needed space at the top of recovery stack 202 (block 404). The context information (including the address of the designated recovery routine and the current value of barrier count 225) is then saved in the newly allocated space at the top of the stack and the address of the footprint area returned to the mainline routine that called frr_add( ) (block 406).

Once frr_add( ) returns, the mainline code for the recovery-enabled routine executes(block 408). If during the execution of this mainline code, an exception is raised signifying some type of failure, the recovery manager routine (described in FIG. 5) is called to attempt recovery (block 420). Once the recovery has taken place, any post-recovery code contained in the recovery-enabled routine is executed (block 422). Following mainline code execution (or failure recovery, as the case may be), at the end of the recovery-enabled routine, function frr_delete( ) is executed to reverse the effects of frr_add( ).

Function frr_delete( ) proceeds as follows: If the overflow counter is greater than zero (block 410:Yes), the overflow counter is decremented (block 414). Otherwise (block 416: No), the recovery stack space allocated at block 404 is reclaimed by adjusting recovery stack TOS pointer 216 appropriately so as to effect a "pop" of the topmost context entry from recovery stack 202.

Figure 5:
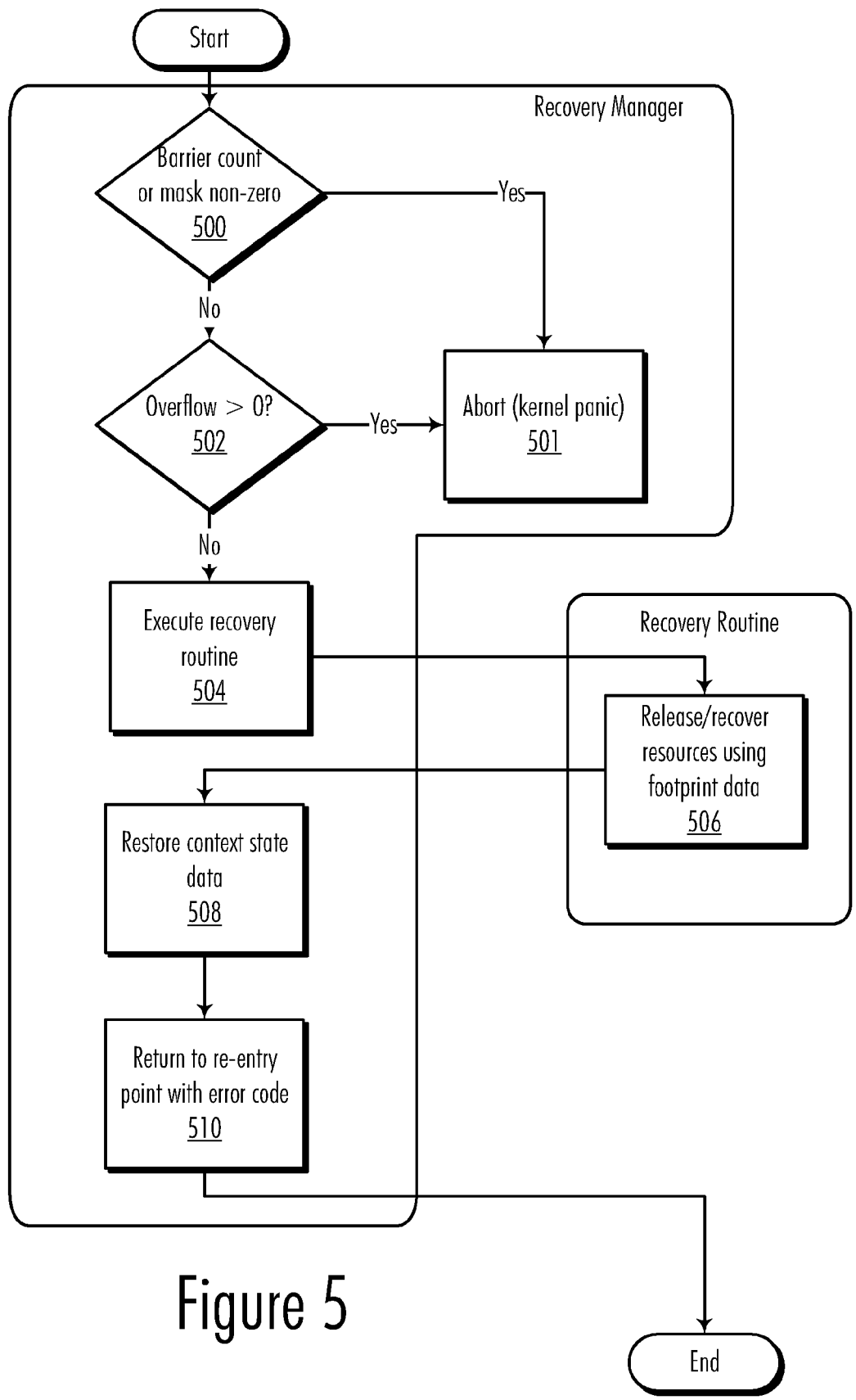
FIG. 5 is a flowchart representation of a process of handling an exception in operating system kernel code in accordance with a preferred embodiment of the present invention.

FIG. 5 is a flowchart representation of a process of handling an exception in operating system kernel code in accordance with a preferred embodiment of the present invention. As previously mentioned in conjunction with FIG. 5, if a failure exception occurs, execution of a recovery manager routine is triggered (block 320). Turning now to FIG. 5, we now describe the operations performed by the recovery manager routine. The recovery manager routine must first determine whether recovery can be performed. If the context's barrier count (barrier count 225 in FIG. 2) or the mask value at the top of the recovery stack (value 214 in FIG. 2) is non-zero (block 500:Yes), then it can be concluded that the failure occurred during a routine that is not recovery-enabled and an abort (kernel panic) is triggered for the unrecoverable failure (block 501). If the overflow counter is greater than zero (block 502: Yes), then it can be concluded that no recovery information is stored on the recovery stack for the routine in which the failure occurred (thus making the failure unrecoverable) and an abort (kernel panic) is triggered for the unrecoverable failure (block 501). If neither of these unrecoverable conditions is true (blocks 500 & 502:No), then the designated recovery routine pointed to by recovery routine pointer 208 at the top of recovery stack 202 is executed (block 504).

The designated recovery routine performs the following tasks: The recovery routine uses information stored in footprint 204 on recovery stack 202 to release or recover system resources (memory, mutexes, etc.) held by the failing routine (block 506). After the recovery routine has completed, in preparation for re-entry to the failing routine at the designated re-entry point, the recovery manager restores context information (such as register contents) stored on recovery stack 202 (block 508). Finally, the recovery manager resumes execution of the failing routine at the designated re-entry point while returning a non-zero error code to trigger the execution of appropriate post-recovery code in the failing routine (block 510).

As stated previously, when a recovery-enabled routine calls a non-recovery-enabled routine, the barrier count or mask value must be made to have a non-zero value so that in the event of a failure, the recovery manager will not attempt to use the context and footprint information at the top of the recovery stack to recover from the failure. In a preferred embodiment, both a barrier count and a mask value are used in this way, so as to facilitate the gradual modification of legacy kernel code to include recovery. For example, in any given build, some kernel routines may have been modified to support recovery and others may not. Using two different mechanisms (barrier count and mask value), as in a preferred embodiment of the present invention, makes it possible for non-recovery-enabled routines to be called by recovery-enabled routines without the called routine's knowing whether recovery is currently active or not. The barrier count mechanism is used by a called non-recovery-enabled routine to disable recovery, while the mask value is used by a recovery-enabled calling routine to disable recovery before calling the non-recovery-enabled routine. FIGS. 6 and 7 illustrate these two mechanisms in flowchart form.

FIG. 6 is a flowchart representation of a process of calling a routine of non-recovery-enabled kernel code from a routine of recovery-enabled kernel code in which a mask value is used to temporarily disable recovery. As FIG. 6 represents the execution of the calling routine, which is recovery-enabled, the recovery-enabled routine first calls frr_add( ) to assign itself a recovery routine (block 600). Just before calling the non-recovery-enabled routine (block 604), the calling routine sets the mask value to a non-zero value (block 602), thereby preventing the recovery manager routine from attempting recovery. Setting the mask to a non-zero value can be done by calling a kernel service or by using a C language macro (such as FRR_MASK( )). After execution returns from the non-recovery-enabled routine, the recovery-enabled calling routine clears the mask to zero (block 606). Finally, the calling routine calls frr_delete( ) to pop the context and footprint information from the recovery stack (block 608).

FIG. 7 is a flowchart representation of an alternative process of calling a routine of non-recovery-enabled kernel code from a routine of recovery-enabled kernel code in which a barrier count value is used to effect temporary recovery disablement. Unlike the embodiment described in FIG. 6, in this case recovery is disabled by the called non-recovery-enabled routine. Immediately after being called (block 700) but before performing the main operations of the non-recovery-enabled routine (block 704), the non-recovery-enabled routine called a kernel service called frr_barrier_add( ) to increment the barrier count (barrier count 225 in FIG. 2) (block 702). Recall that as long as the barrier count is greater than zero, the recovery manager routine will not attempt recovery. After the main operations of the routine have completed, the barrier count is decremented via kernel service frr_barrier_delete( ) (block 706) and the routine returns control to its caller (block 708).

One skilled in the art will recognize that this barrier count mechanism supports nesting of recovery-enabled and non-recovery-enabled routines, since the current barrier count is saved to the recovery stack each time a new context entry is pushed to the recovery stack (by frr_add( )). The saved barrier count is then restored when the context entry is popped (by frr_delete( )).

Figure 8:
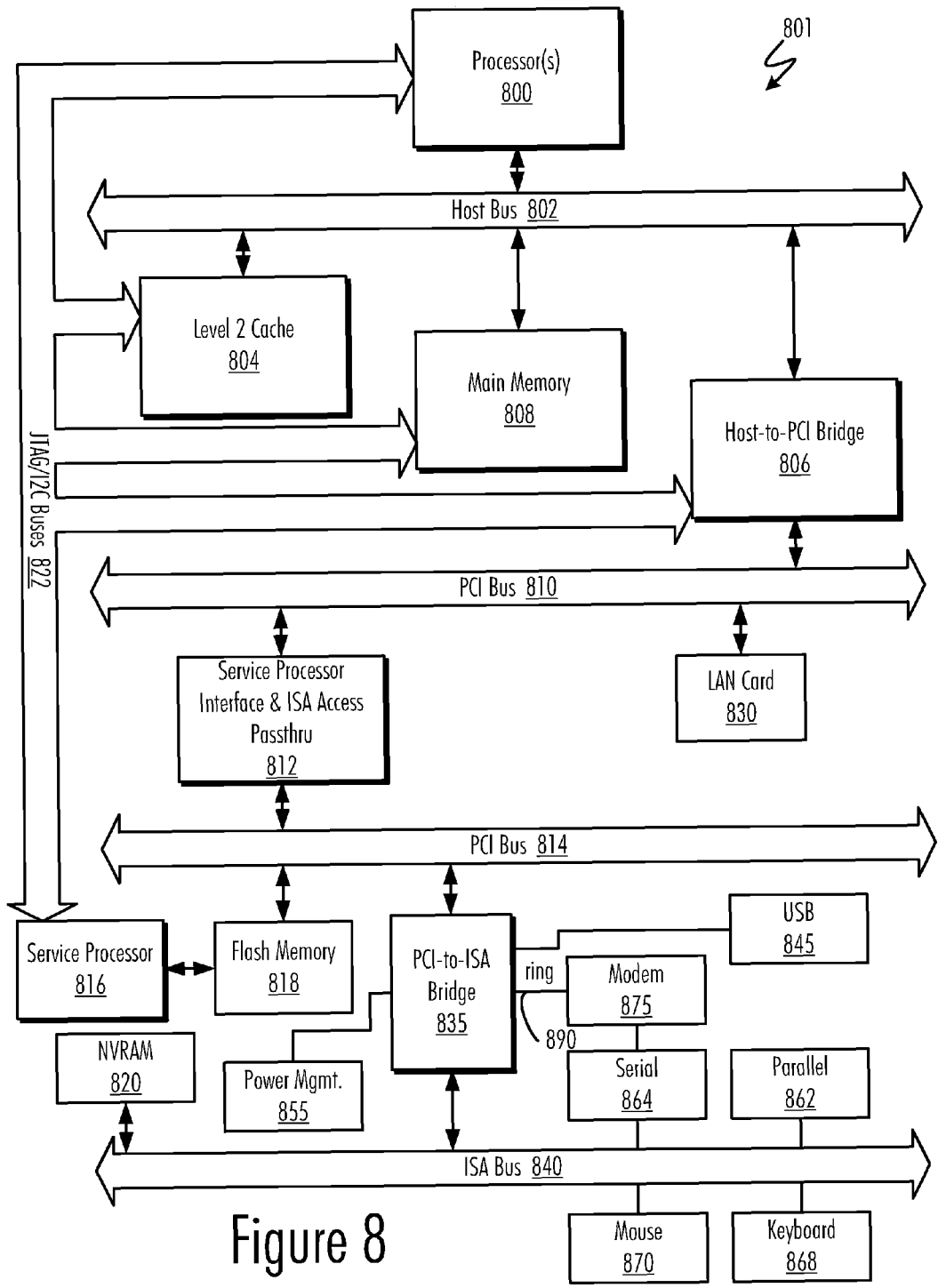
FIG. 8 is a block diagram of a data processing system in which a preferred embodiment of the present invention may be implemented.

FIG. 8 illustrates information handling system 801 which is a simplified example of a computer system/data processing system capable of performing the computing operations described herein with respect to a preferred embodiment of the present invention. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor (s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C buses 822 for communication with processor(s) 800 during initialization steps. JTAG/I2C buses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A computer-implemented method comprising:
   providing a first routine of code in a runtime environment for allocating space to hold recovery-related information on a stack, wherein the routine provides a pointer and assigns to the pointer a value that is an address of the allocated space;
   determining if recovery in the runtime environment is to be disabled;
   in response to a determination that recovery in the runtime environment is to be disabled, replacing the first routine with a second routine, wherein the second routine also provides said pointer, but, assigns to the pointer a value that is a fixed address of a scratchpad area; and
   writing the recovery-related information to memory having an address that is the value assigned to the pointer.

2. The method of claim 1, wherein the runtime environment is an operating system.

3. The method of claim 1, wherein said determining takes place during initial startup of the runtime environment.

4. The method of claim 1, wherein the recovery-related information includes state information regarding an execution state of the runtime environment.

5. The method of claim 1, wherein the first routine is replaced by the second routine by way of modifying the first routine to transform the first routine into the second routine.

6. The method of claim 1, wherein the first routine and second routine are configured to provide the pointer as a return value.

7. The method of claim 1, wherein the pointer points to the fixed address, and the method further comprises:
   writing recovery-related information pertaining to a third routine in the scratchpad area;
   calling a fourth routine from the third routine; and
   overwriting the previously-written recovery-related information in the scratchpad area with recovery-related information pertaining to the fourth routine.

8. A computer program product in a tangible and computer-readable storage medium of computer code, comprising functional descriptive material that, when executed by a computer, causes the computer to perform actions that include:
   providing a first routine of code in a runtime environment for allocating space to hold recovery-related information on a stack, wherein the routine provides a pointer and assigns to the pointer a value that is an address of the allocated space;
   determining if recovery in the runtime environment is to be disabled;
   in response to a determination that recovery in the runtime environment is to be disabled, replacing the first routine with a second routine, wherein the second routine also provides said pointer, but, assigns to the pointer a value that is a fixed address of a scratchpad area; and
   writing the recovery-related information to memory having an address that is the value assigned to the pointer.

9. The computer program product of claim 8, wherein the runtime environment is an operating system.

10. The computer program product of claim 8, wherein said determining takes place during initial startup of the runtime environment.

11. The computer program product of claim 8, wherein the recovery-related information includes state information regarding an execution state of the runtime environment.

12. The computer program product of claim 8, wherein the first routine is replaced by the second routine by way of modifying the first routine to transform the first routine into the second routine.

13. The computer program product of claim 8, wherein the first routine and second routine are configured to provide the pointer as a return value.

14. The computer program product of claim 8, wherein the pointer points to the fixed address, and said actions further include:
   writing recovery-related information pertaining to a third routine in the scratchpad area;
   calling a fourth routine from the third routine; and
   overwriting the previously-written recovery-related information in the scratchpad area with recovery-related information pertaining to the fourth routine.

15. A data processing system comprising:
   at least one processor;
   storage accessible to the at least one processor; and
   a set of instructions in the storage, wherein the at least one processor executes the set of instructions to perform actions that include:
      providing a first routine of code in a runtime environment for allocating space to hold recovery-related information on a stack, wherein the routine provides a pointer and assigns to the pointer a value that is an address of the allocated space;
      determining if recovery in the runtime environment is to be disabled;
      in response to a determination that recovery in the runtime environment is to be disabled, replacing the first routine with a second routine, wherein the second routine also provides said pointer, but, assigns to the pointer a value that is a fixed address of a scratchpad area; and
      writing the recovery-related information to memory having an address that is the value assigned to the pointer.

16. The data processing system of claim 15, wherein the runtime environment is an operating system.

17. The data processing system of claim 15, wherein said determining takes place during initial startup of the runtime environment.

18. The data processing system of claim 15, wherein the recovery-related information includes state information regarding an execution state of the runtime environment.

19. The data processing system of claim 15, wherein the first routine is replaced by the second routine by way of modifying the first routine to transform the first routine into the second routine.

20. The data processing system of claim 15, wherein the pointer points to the fixed address, and said actions further include:
    writing recovery-related information pertaining to a third routine in the scratchpad area;
    calling a fourth routine from the third routine; and
    overwriting the previously-written recovery-related information in the scratchpad area with recovery-related information pertaining to the fourth routine.

* * * * *